US007013261B2

(12) United States Patent
Eisele

(10) Patent No.: US 7,013,261 B2
(45) Date of Patent: Mar. 14, 2006

(54) METHOD AND SYSTEM FOR ACCELERATED MORPHOLOGICAL ANALYSIS

(75) Inventor: Andreas Eisele, Saarbruecken (DE)

(73) Assignee: Xerox Corporation, Stamford, CT (US)

( * ) Notice: Subject to any disclaimer, the term of this patent is extended or adjusted under 35 U.S.C. 154(b) by 962 days.

(21) Appl. No.: 09/977,341

(22) Filed: Oct. 16, 2001

(65) Prior Publication Data
US 2003/0074189 A1 Apr. 17, 2003

(51) Int. Cl.
G06F 17/27 (2006.01)
G10L 21/00 (2006.01)

(52) U.S. Cl. .......................................... 704/9; 704/270
(58) Field of Classification Search ..................... None
See application file for complete search history.

(56) References Cited

U.S. PATENT DOCUMENTS

| | | | |
|---|---|---|---|
| 4,899,148 A | | 2/1990 | Sato et al. |
| 5,099,426 A | * | 3/1992 | Carlgren et al. ............... 704/9 |
| 5,323,316 A | * | 6/1994 | Kadashevich et al. ......... 704/9 |
| 5,325,091 A | | 6/1994 | Kaplan et al. |
| 5,374,928 A | | 12/1994 | Moore et al. |
| 5,721,939 A | | 2/1998 | Kaplan |
| 5,890,103 A | * | 3/1999 | Carus ............................ 704/9 |
| 6,466,901 B1 | | 10/2002 | Loofbourrow et al. |
| 2002/0022956 A1 | * | 2/2002 | Ukrainczyk et al. ........... 704/9 |

OTHER PUBLICATIONS

XeLDA: Xerox Linguistic Development Architecture, Advanced Technology and Systems, available on the Internet on Oct. 1, 2001 at http://www.xrce.xerox.com/ats/xelda/overview.html.
Brun, C., "Terminology Finite-State Processing for Computational LFG," $36^{th}$ Annual Meeting of the Association for Computational Linguistics and $17^{th}$ International Conference on Computational Linguistics, Proceedings of the Conference, Vo. 1, 1998, pp. 196-200.
Turba, T. N., "Checking for Spelling and Typographical Errors in Computer-Based Text," ACM Sigplan Notices, Proceeding of the ACM Sigplan Sigoa Symposium on Text Manipulation, vol. 16, No. 6, Jun. 1981, pp. 51-60.

* cited by examiner

*Primary Examiner*—W. R. Young
*Assistant Examiner*—Brian L. Albertalli
(74) *Attorney, Agent, or Firm*—Oliff & Berridge, PLC; Eugene Palazzo

(57) ABSTRACT

A system provides accelerated morphological analysis and in particular a speed-up of morphological look-up via a caching mechanism. The system determines whether each incoming token in a token stream is unique or recurring. Unique tokens, which occur for the first time in the token stream, are marked with a unique numerical identification (ID). A pointer is added to recurring tokens, which already occurred in the token stream, and directed towards the unique numerical ID which was defined for the respective token when occurring for the first time. A morphological look-up is performed on the unique tokens. Subsequently, the tokens carrying the pointer are detected and replaced with the results of morphological look-up stored under the unique numerical ID of the respective unique token.

20 Claims, 4 Drawing Sheets

METHOD AND SYSTEM FOR ACCELERATED MORPHOLOGICAL ANALYSIS

BACKGROUND OF THE INVENTION

1. Field of the Invention

This invention relates to a method and system for morphological analysis and in particular to a morphological look-up. Morphological analysis represents the basic enabling technology for many kinds of text processing. Recognition of word forms is the first step towards part of speech tagging, parsing, translation and other high level applications. The method and system are applicable to all natural languages.

2. Description of Related Art

Many natural language processing tasks require the morphological analysis of all running tokens in an input document. By means of morphological analysis, any information that is encoded in a word can be extracted and output in order to present it to later layers of text processing. This stream of morphological analyses can be extracted from a raw document by using the standard architecture which is depicted in FIG. 4.

Before any text processing can be performed on a raw document 400, the text must be broken up into distinct and meaningful units. This procedure is called tokenizing and each meaningful unit or token in general is delimited from other meaningful units by a particular character or other symbol. A description of a possible method and apparatus for tokenizing text is for instance given in the U.S. Pat. No. 5,721,939. The tokenizing procedure is symbolized in FIG. 4 by the tool tokenize 402, which can be a linguistic service of XeLDA (Xerox Linguistic Development Architecture) developed by Xerox Corporation. This module uses a first finite state transducer 404 built from declarative specifications of the transformation to be done in the tokenizing procedure. The raw document 400 as a result is transformed into a token stream 406. In a next step, each token of the token stream 406 is subject to a morphological look-up procedure performed by the look-up tool 408. The morphological analysis is done by means of a second finite state transducer 410. As a result, a stream of morphological analyses 412 is generated and can be the basis of a further natural language processing task. The technology which is underlying the operations shown in FIG. 4 has been developed at Xerox PARC and XRCE and is described in numerous publications and patents.

In the ideal case, both tokenize 402 and look-up 408 can be quite fast, requiring essentially only one or a few table look-up operations per input character. However, the analysis of a token against the morphological transducer 410 can be much slower than desirable and may involve a backtracking search for the right path in one or several lexical transducers. In extreme cases, the procedure of morphological look-up can require time that is exponential in the length of the input token. This occurs mainly when an exponential number of intermediate results has to be generated, for example in the re-accentuation of French words, from which accents have been removed. For some applications, the speed of morphological analysis is a major concern. In information retrieval systems, it may be required to analyze many gigabytes of texts in a limited time frame, especially when documents are frequently updated. Ongoing theoretical and practical work on algorithms for the partial sequence realization of finite state transducers has already lead to important progress. However, the urgent need for fast implementations of morphological look-up motivates the search for short term solutions, which may achieve a partial effect without changes in the underlying look-up machinery and transducers.

Given these problems with the existing technology, it would be advantageous to provide a method and system that uses a cache memory to avoid repeated morphological look-up of the same token in the processing of large documents and thereby increases the processing speed substantially.

It would be further advantageous to provide a system being modular and not requiring modifications of the existing machinery.

It would also be advantageous to provide a system that allows an optimization of the parameters processing speed and memory capacity.

SUMMARY OF THE INVENTION

The present invention exploits the fact that tokens in natural language documents are quite often recurring. If the repeated look-up of the same token can be avoided, this will lead to a substantial reduction in processing time. For instance, in about 100 million running tokens from the British National Corpus, only 863,531 distinct forms, called types, appear, i.e. each type appears about 116 times in average. Whereas this ratio is less drastic for languages with richer morphology, it can still lead to a noticeable reduction in look-up time. In 1,539,443 running tokens of Finnish text from the European Parliament, only 116,058 types are used (that means that each token re-appears about 13 times).

The idea of the present invention is to bypass the morphological look-up for the second and subsequent occurrences of the same token that appear in a set of documents, and to use stored results instead in all these cases.

According to a first aspect of the invention, a method for performing morphology analysis of a natural language document is provided, wherein it is checked for each incoming token, whether it is a unique token, which is occurring for the first time in the token stream, or a recurring token, which already occurred earlier in the token stream. Tokens that have been seen before are marked with a pointer to an identification (ID), which has been assigned when the token occurred for the first time and are carried over directly to the output stream, so that they need not be processed again by the morphological look-up. Here such entries are detected and replaced by the results that have been stored under this ID in a database that can be constructed dynamically. Unique tokens are marked with a new ID and a morphological look-up is performed only on the unique tokens, thereby producing results of morphological look-up, and the results of morphological look-up gained for the unique tokens are stored together with the ID.

According to a second aspect, the invention provides a system for performing morphology analysis of a natural language document which comprises a tokenizer for tokenizing an input document thereby producing a token stream. The system further comprises a pre-processor that checks for each token of the token stream, whether it is a unique token, which is occurring for the first time in the token stream or a recurring token which already occurred earlier in the token stream. Unique tokens are marked with an identification (ID) and to recurring tokens, a pointer is added, which is directed towards the ID that has been defined for the respective token when occurring for the first time. The system further comprises a morphological look-up module for performing a morphological look-up only on the unique tokens, thereby producing results of morphological look-up. Memory is provided for storing the results of morphological look-up for the unique tokens together with the ID. A post-processor detects tokens which carry a pointer and replaces them by the results of morphological look-up which are stored in the memory under the respective ID.

According to a third aspect of the present invention, there is provided a system for performing morphology analysis of a natural language document, which comprises a tokenizer for tokenizing an input document, thereby producing a token stream, and a control unit that combines the functionality of the pre-processor and post-processor of the system according to the second aspect: the control unit checks for each token of the token stream whether it is a unique token or a recurring token, marks unique tokens with an ID and adds to recurring tokens a pointer directed towards the ID which has been defined for the respective token when occurring for the first time and initializes a morphological look-up for the unique tokens and replaces recurring tokens marked with a pointer by results of morphological look-up stored in memory under the respective ID. The system further comprises a morphological look-up module which is controlled by the control module and performs the morphological look-up, thereby producing results of morphological look-up. The system also comprises memory which is controlled by the control module for storing results of morphological look-up for the unique tokens together with the ID.

BRIEF DESCRIPTION OF THE DRAWINGS

The accompanying drawings are incorporated into and form a part of a specification to illustrate several embodiments of the present invention. These drawings together with the description, serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein.

DETAILED DESCRIPTION

Figure 1:
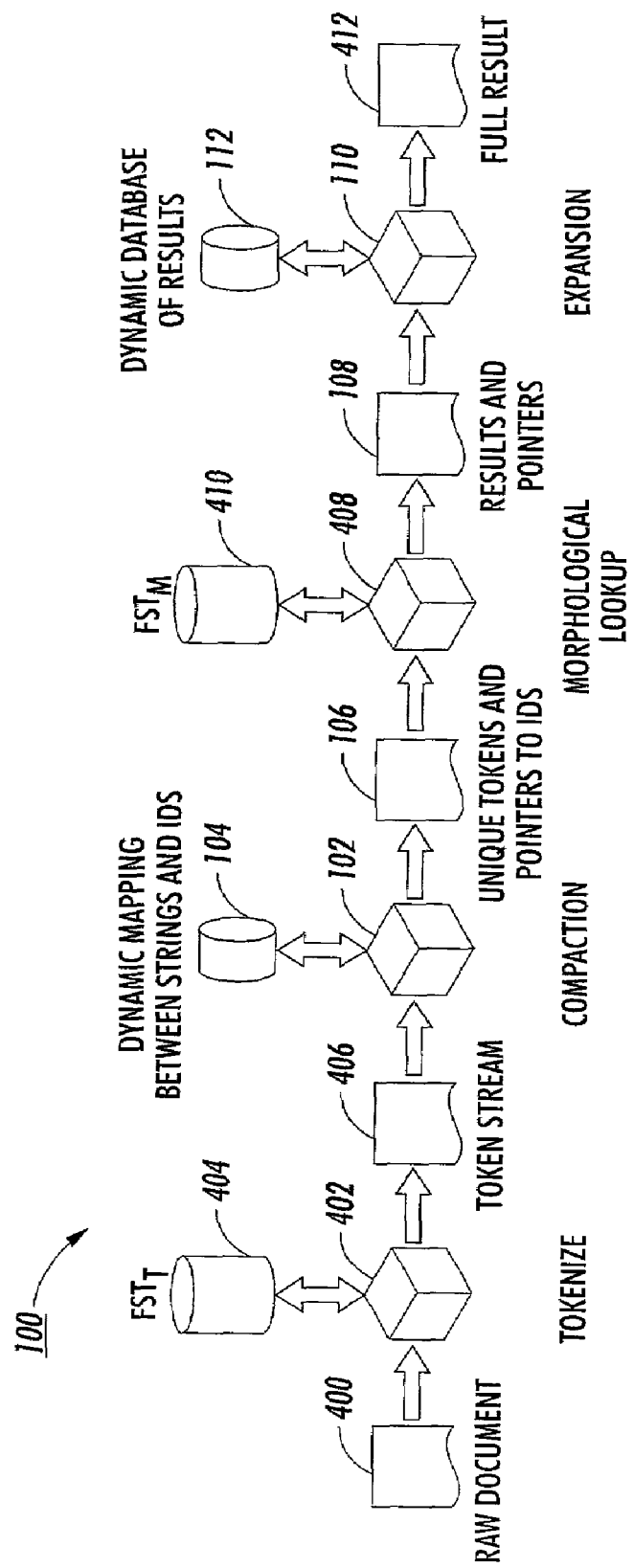
FIG. 1 illustrates a first variant of an architecture for performing morphology analysis of a natural language document according to the present invention.

Referring now to the drawings, FIG. 1 illustrates a block diagram of a system 100 for performing morphology analysis of a natural language document. As known in the art, the raw document 400 is first tokenized by the tokenizing tool (i.e., tokenizer) 402, whereby a token stream 406 is created. In order to avoid a repeated morphological look-up of recurring tokens, the system 100 comprises a pre-processor 102 that performs a compaction of the token stream 406 by checking for each incoming token, whether it has already been seen earlier in the stream of tokens 406. Words that have been seen before, namely the so-called unique tokens, are marked with a unique identification (ID) that may for example be numerical, so that they need not be processed again by the morphological look-up 408. The morphological look-up tool 408 used at XRCE has a built-in mechanism to copy tokens that already carry an annotation over to the output stream. The compaction unit 102 also communicates with the first storing unit 104 that performs a dynamic mapping between strings and numerical IDs.

Consequently, only the unique tokens together with their respective ID's are input into the morphological look-up tool 408. The morphological look-up procedure is performed by means of a finite state transducer 410. The results of this morphological look-up are input into a post-processor 110 together with the recurring tokens and the pointers towards their numerical ID. The post-processor 110 performs an expansion on this data stream 108. By communicating with a dynamic database in memory 112 containing the stored results of the morphological look-up, it detects entries carrying a pointer and replaces them with the results that have been stored under this numerical ID in the dynamic database in memory 112, which is constructed dynamically. As a full result, the post-processor 110 outputs the stream of morphological analyses 412. The post-processor 110 also stores the newly gained results under the respective numerical ID in the dynamic database in memory 112.

Figure 4:
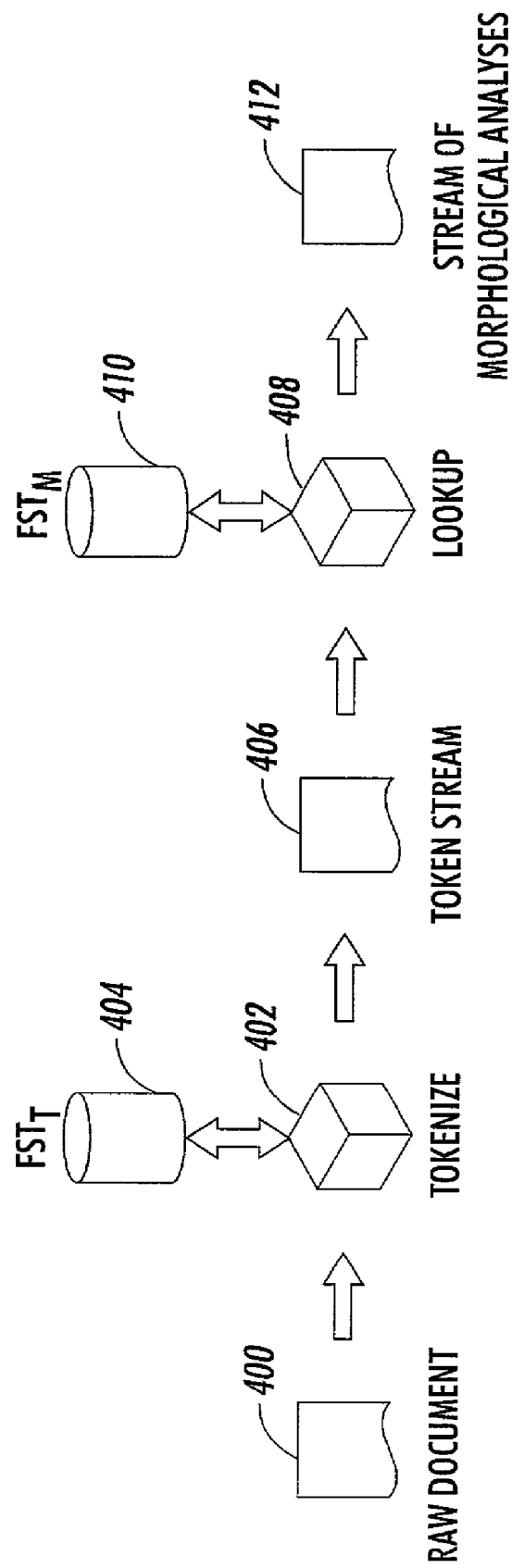
FIG. 4 illustrates a standard architecture for a pre-processing of text according to the prior art.

This simple architecture has the advantage of being modular and requires no modification of the existing machinery as depicted in FIG. 4. Furthermore, it preserves the overall architecture of the tokenizing and morphological look-up tools which is based on multiple processes that are communicating through pipes. The use of self-extending hash tables for the storage of the mapping between strings and ID's provides the advantage that there is no need to optimize application dependent constants like the size of the hash table and thus there is no significant delay during the start-up of the process.

However, this modularity implicates a lack of communication between the pre-processor 102 and the modules that come after it. Therefore, the pre-processor 102 knows neither the size of the result of the morphological look-up nor the time needed for the construction of this result which are both factors that would influence a more careful decision on whether to store an analysis or not in situations where both time and space consumption are critical. In this first architecture, the memory organization of the post-processor 110 cannot be known to the pre-processor 102. Hence, the decision on what results to store for later reuse must be based on a simplifying assumption. As long as an optimization is aiming mainly at speed, these concerns do not have high priority, and therefore in a first approximation all results can be stored.

Figure 2:
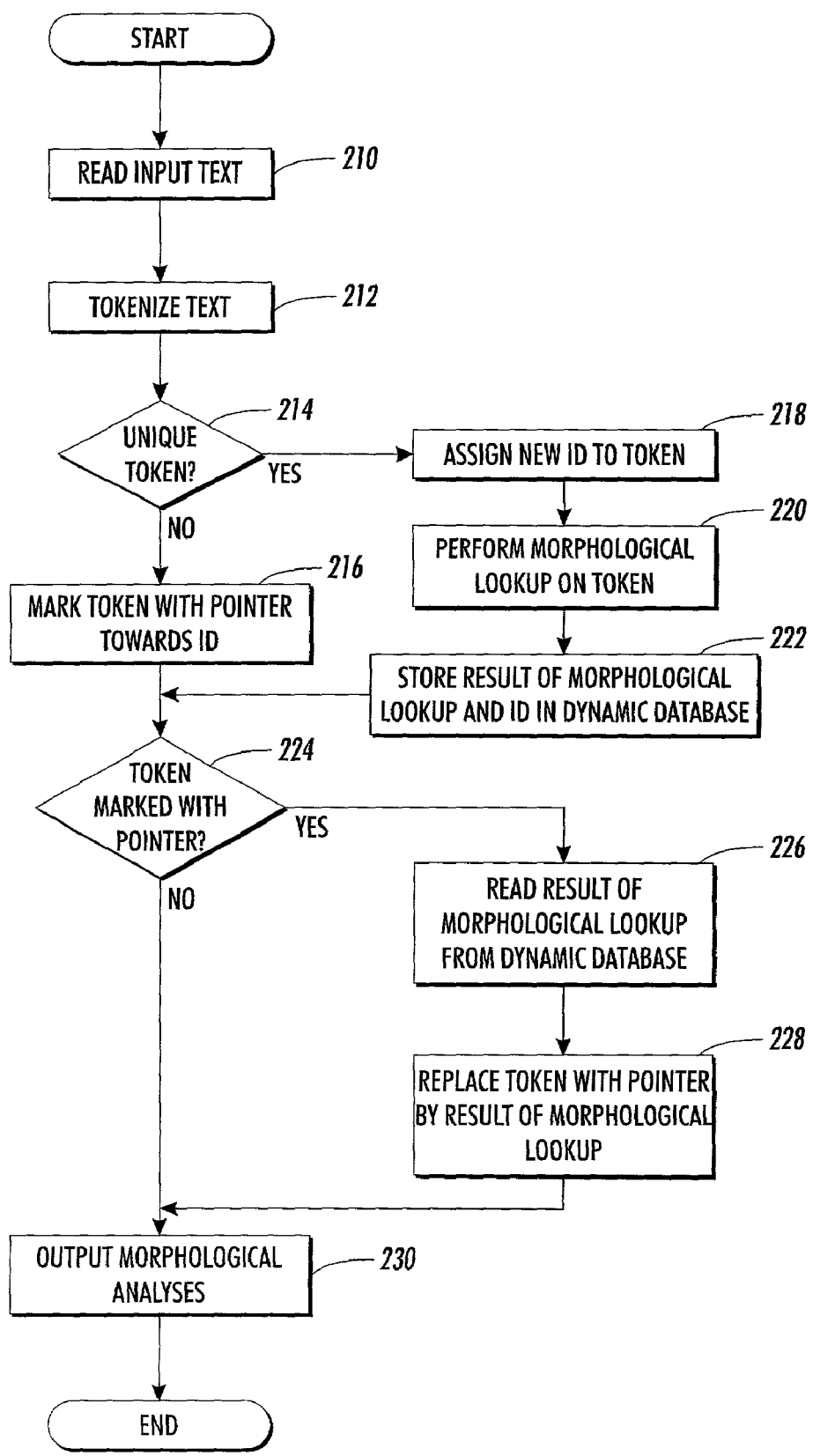
FIG. 2 is a flow chart outlining the basic steps of a method according to the present invention.

FIG. 2 shows a flow chart of the essential steps of a method for performing morphology analysis of a natural language document according to the present invention. In a first step 210, the input text is read. This text is tokenized in the subsequent step 212, and at branching point 214 it is decided whether a token of the tokenized text is a unique token, which is occurring for the first time in the token stream or not. For the case that it is not a unique token, but a recurring token, the next step is 216, wherein the token is marked with a pointer directed towards the ID which was defined for the respective token when occurring for the first time. In case that a token is indeed a unique token, in step 218, a new ID is assigned to the respective token. In step 220 a morphological look-up procedure is performed on this token. The result obtained from this morphological look-up is stored together with the numerical ID in a dynamic database as shown in step 222. At branching point 224, it is decided whether a token has a pointer attached thereto. If this is the case, in step 226, the result of morphological look-up, which is stored under the respective ID, is read from the dynamic database. In step 228 the token marked with a pointer is replaced by this result of morphological look-up. Finally, in step 230 the complete morphological analyses can be output.

Figure 3:
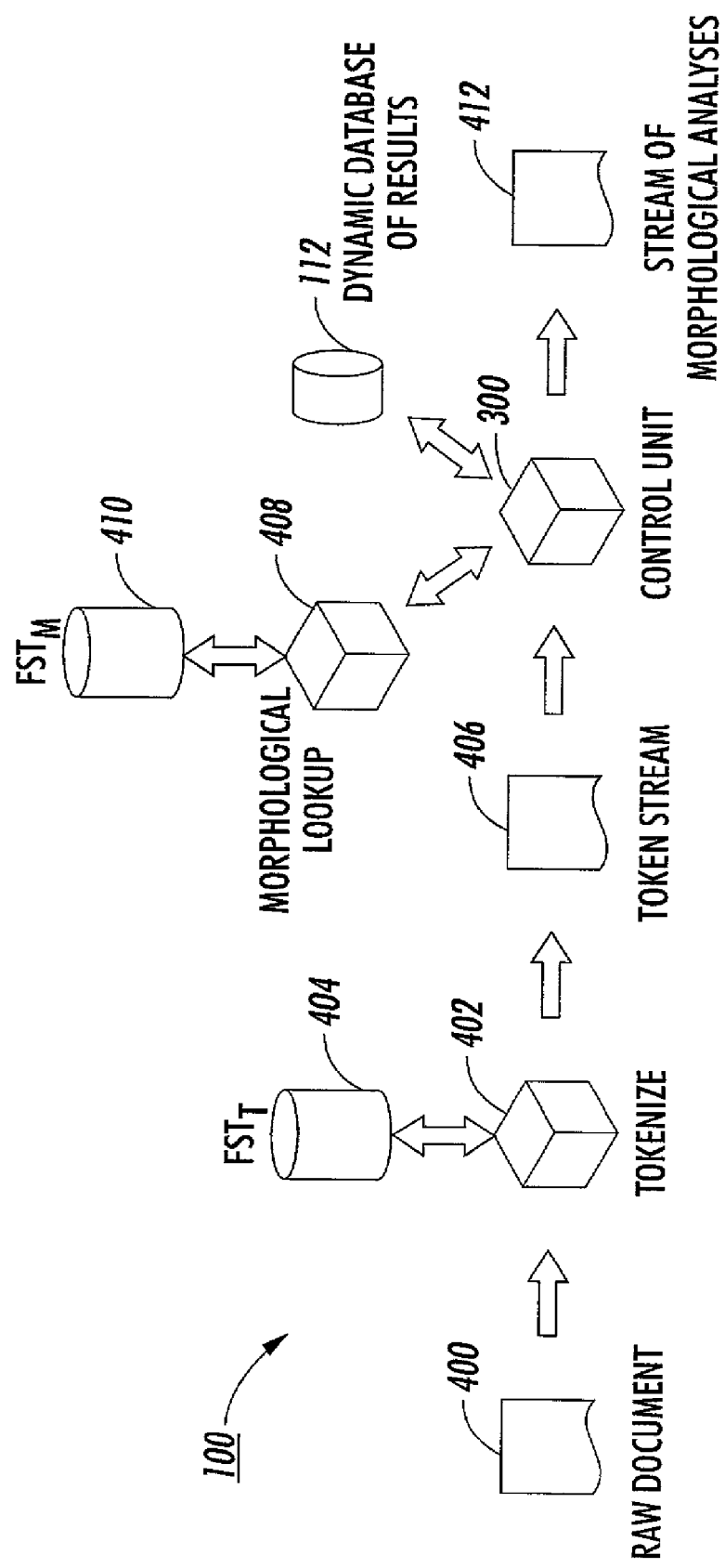
FIG. 3 is a block diagram of an alternative architecture according to the present invention.

In typical applications in which very high speed of morphological analysis is required, there is no shortage of memory, even fast main memory. Thus, additional memory consumption can be accepted if time consumption is reduced in return. However, a more efficient use of the available memory can be made when implementing the present invention in the architecture shown in FIG. 3. Here the morphological look-up 408 is used as a server for a controlling process that combines the functionality of pre-processor 102 and post-processor 110 shown in FIG. 1. A control unit 300 controls the morphological look-up module 408 and the dynamic database in memory 112. Thus, the memory can be recycled by removing entries that are so infrequent, that keeping them would be more expensive than re-computing them for later recurrences. This architecture requires a true two-way connection between the client and the server in order to avoid deadlock situations.

For a further optimization of the necessary cache memory and time consumption, the optimal cache size could be calculated. Moreover, the optimal length of time that the cache memory has to be dynamically updated, could be calculated, since according to Zipf's Law, most commonly recurring tokens will be seen at a certain point. The cache memory can also be pre-filled with the results of the morphological look-up for a certain amount of most commonly occurring tokens in a desired language.

In order to evaluate the idea of the invention empirically, a simple variant of the first architecture shown in FIG. 1 has been implemented, in which pre-processing and post-processing are done in separate processes connected through UNIX pipes. The implementation of the pre-processor 102 was based on a library for self-extending hash tables and the post-processor 110 consisted of a simple C-program. The system 100 was evaluated with morphological analyzers for several European languages which exist at XRCE. In order to investigate on how the performance depends on the type and size of the corpus, corpora from different domains and sections of different sizes were used. To reduce the effect of irrelevant modules in the measurements, they were performed on pre-tokenized text. The results are displayed in Table 1, wherein all times represent the sum of user and system times on a SUN Ultra Enterprise.

TABLE 1

| Corpus | British National Corpus | BNC | BNC | psyndex (German) | epades-fi (Finnish) | Sda-fr (French) |
|---|---|---|---|---|---|---|
| Type Of Morphological Lookup | −1 | −1 | −2 | | −1 | −2 |
| Tokens | 1,000,000 | 10,000,000 | 1,000,000 | 2,546,525 | 1,539,443 | 100,000 |
| Differing Tokens | 49899 | 192637 | 49899 | 156069 | 116058 | 12747 |
| Time For Original Lookup [s] | 37.6 | 380.0 | 56.5 | 340.46 | 103.18 | 545.4 |
| Time For Compaction [s] | 5.1 | 52.1 | 4.9 | 14.21 | 8.65 | 0.5 |
| Time For Lookup Of Compacted Corpus [s] | 10.0 | 87.0 | 12.7 | 67.09 | 25.99 | 39.2 |
| Time For Expansion [s] | 6.0 | 55.5 | 5.4 | 20.42 | 9.7 | 0.5 |
| Time For New Lookup [s] | 21.1 | 194.6 | 23.0 | 101.72 | 44.34 | 40.2 |
| Increase Of Throughput | 78.2% | 95.3% | 145.7% | 234% | 132.7% | 1256% |

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas, in which it is believed that those of ordinary skill in the art are familiar, have not been described herein in order not to obscure unnecessarily the invention described herein. Accordingly, it has to be understood that the invention is not to be limited by the specific illustrative embodiments, but only by the scope of the appended claims.

What is claimed is:

1. A method for performing morphology analysis of a natural language document, comprising the steps of:
    inputting the natural language document as an input text,
    tokenize the input text, thereby producing a token stream of a plurality of tokens,
    comparing each token of the token stream to a list of previously encountered tokens in the token stream,
    determining whether the token either corresponds to at least one previously encountered token in the list as a recurring token in the token stream, or else is a unique token in the token stream without corresponding to the at least one previously encountered token in the list,
    adding the unique token to the list of previously encountered tokens, marking the unique token with an identification, adding a pointer directed towards the identification for the recurring token, performing a morphological look-up only on the unique token, thereby producing a morphological look-up result, storing said morphological look-up result for the unique token together with the identification, reading the morphological look-up result for the recurring token, joining the morphological look-up results for the unique and recurring tokens, thereby producing a stream of morphological analyses, and outputting the stream of morphological analyses.

2. The method according to claim 1, wherein the step of storing the morphological look-up result for the unique token together with the identification comprises the step of creating a dynamically extending database.

3. The method according to claim 2, wherein said dynamically extending database is a self-extending hash table.

4. The method according to claim 1, wherein the step of tokenizing is performed by a first finite state transducer.

5. The method according to claim 4, wherein the first finite state transducer includes punctuation conventions and higher level lexical information.

6. The method according to claim 4, wherein the step of morphological look-up is performed by a second finite state transducer.

7. The method according to claim 1, wherein the step of joining the morphological look-up results further comprises replacing the each token and the recurring token with the pointer from the morphological look-up unless the each token is marked with the pointer.

8. A system for performing morphology analysis of a natural language document, comprising:

a tokenizer for tokenizing an input document, thereby producing a token stream of a plurality of tokens, a pre-processor that compares each token of the token stream to a list of previously encountered tokens in the token stream, determines whether the token either corresponds to at least one previously encountered token in the list as a recurring token in the token stream, or else is a unique token in the token stream without corresponding to the at least one previously encountered token in the list, adds the unique token to the list of previously encountered tokens, marks the unique token with an identification and adds a pointer directed towards the identification for the recurring token, a morphological look-up module for performing a morphological look-up only on the unique token, thereby producing a morphological look-up result, memory for storing said morphological look-up result for the unique token together with the identification, a post-processor that replaces a token that carries the pointer with the morphological look-up result stored in the memory under the respective identification.

9. The system according to claim 8, wherein the tokenizer is a first finite state transducer.

10. The system according to claim 9, wherein the tokenizer includes punctuation conventions and higher level lexical information.

11. The system according to claim 9, wherein the morphological look-up module is a second finite state transducer.

12. The system according to claim 8, wherein the memory is a dynamically extending database.

13. The system according to claim 12, wherein said dynamically extending database is a self-extending hash table.

14. The system according to claim 8, wherein memory stores mapping between the unique token and the identification.

15. A system for performing morphology analysis of a natural language document, comprising:

a tokenizer for tokenizing an input document, thereby producing a token stream of a plurality of tokens, a morphological look-up module for producing results of a morphological look-up, memory for storing the results of the morphological look-up for a unique token of the plurality of tokens together with an identification, a control unit for controlling the morphological look-up module and the memory; wherein the control unit:

compares each token of the token stream to a list of previously encountered tokens in the token stream, determines whether the token either corresponds to at least one previously encountered token in the list as a recurring token in the token stream, or else is the unique token in the token stream without corresponding to the at least one previously encountered token in the list, adds the unique token to the list of previously encountered tokens, marks the unique token with the identification, adds a pointer directed towards the identification for the recurring token, initializes the morphological look-up for the unique token, and replaces the recurring token marked with the pointer by the results of the morphological look-up stored in the memory under the respective identification.

16. The system according to claim 15, wherein the tokenizer is a first finite state transducer.

17. The system according to claim 16, wherein the tokenizer includes punctuation conventions and higher level lexical information.

18. The system according to claim 16, wherein the morphological look-up module is a second finite state transducer.

19. The system according to claim 15, wherein the memory is a dynamically extending database.

20. The system according to claim 19, wherein said dynamically extending database is a self-extending hash table.

* * * * *